United States Patent [19]
Huber

[11] 3,861,693
[45] Jan. 21, 1975

[54] CHUCK

[75] Inventor: Robert H. Huber, Easley, S.C.

[73] Assignee: The Singer Company, New York, N.Y. 10020

[22] Filed: Aug. 20, 1973

[21] Appl. No.: 389,926

[52] U.S. Cl............................ 279/61, 279/115
[51] Int. Cl........................................ B23b 31/12
[58] Field of Search............ 279/60, 61, 62, 63, 64, 279/65, 115, 1 K, 1 ME; 81/90 A

[56] References Cited
UNITED STATES PATENTS
914,255   3/1909   Farnham......................... 279/60

FOREIGN PATENTS OR APPLICATIONS
178,247   4/1954   Austria........................... 279/115
314,718   8/1956   Switzerland...................... 279/61

Primary Examiner—Andrew R. Juhasz
Assistant Examiner—W. R. Briggs
Attorney, Agent, or Firm—Marshall J. Breen; Chester A. Williams, Jr.; Harold Weinstein

[57] ABSTRACT

A drill chuck having a body on which a sleeve is mounted for rotation thereon but held against axial movement. Jaw means are supported in the body and movable to open and closed positions in response to rotary movement of the body. The body has an annular threaded groove enclosed by the outer end of the sleeve. Pilot holes are formed on opposite sides of the sleeve in superposition to the threaded groove in the body so as to expose diametrically opposite sides of the threaded groove having oppositely slanted threads. Insertion of a key or bolt to a bottoming condition in the pilot hole and rotating the same will cause the body to rotate and, depending on which pilot hole is being utilized, will cause the jaws to open or close. The key is turned in the same direction regardless of which pilot hole is used.

The present invention contemplates using uniform jaws keyed into position on a non-rotating nut axially shiftable within the chuck upon rotation of the body or sleeve relative to each other. Also, the sleeve can be made of two connected parts, having an internally threaded section to which bevel gear is connected at the upper end thereof.

6 Claims, 13 Drawing Figures

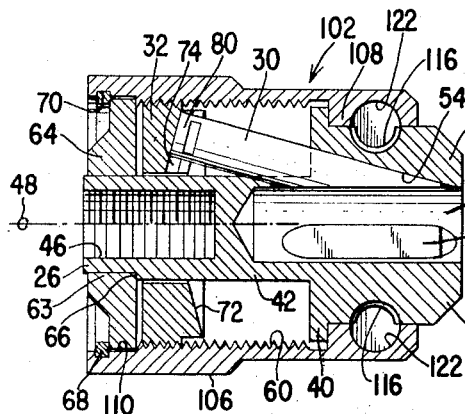
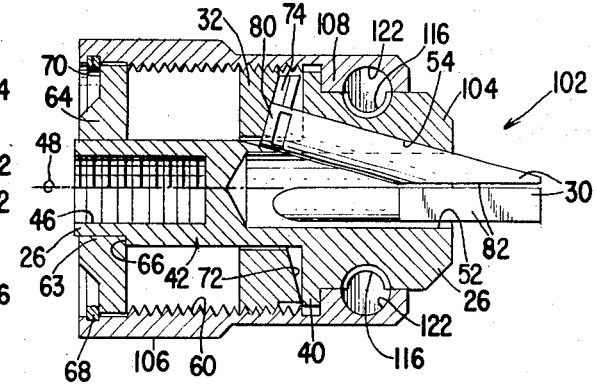
Fig.6　Fig.7
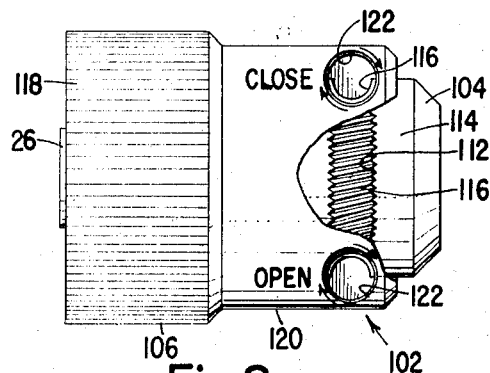
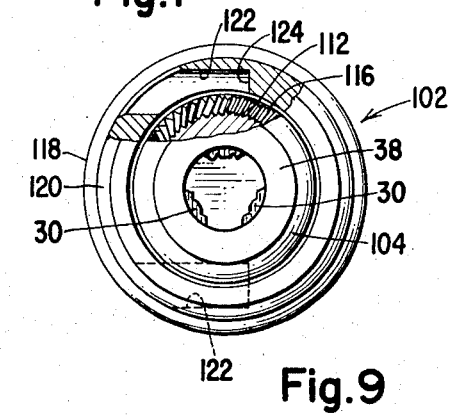
Fig.8　Fig.9
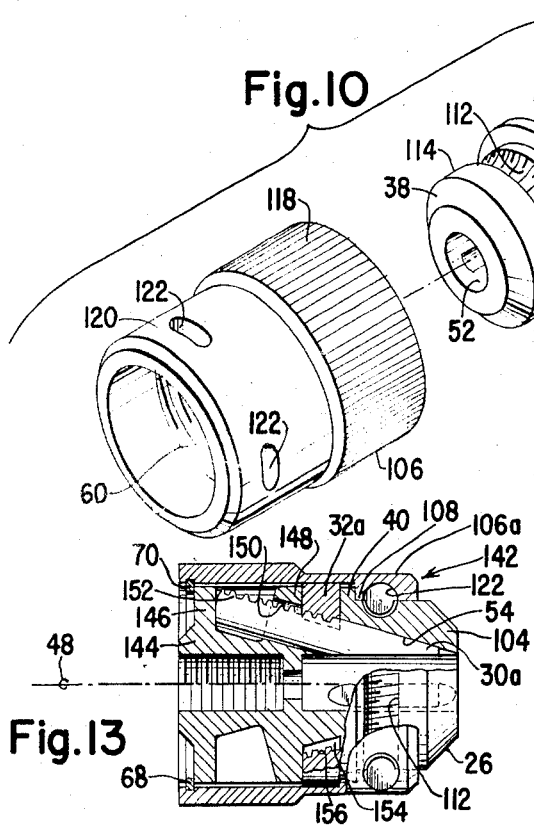
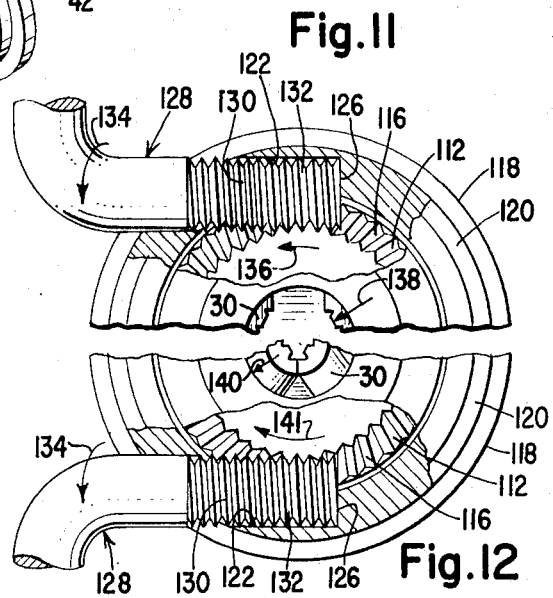
Fig.10　Fig.11　Fig.13　Fig.12

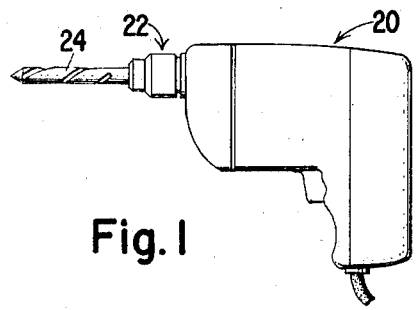
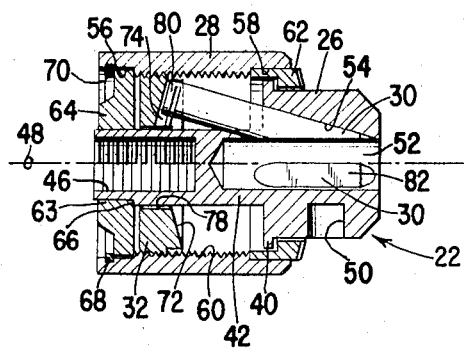
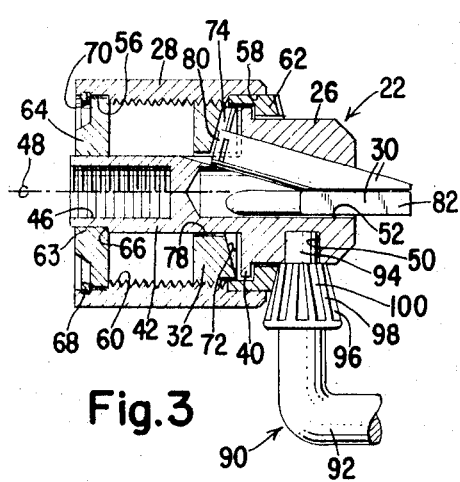
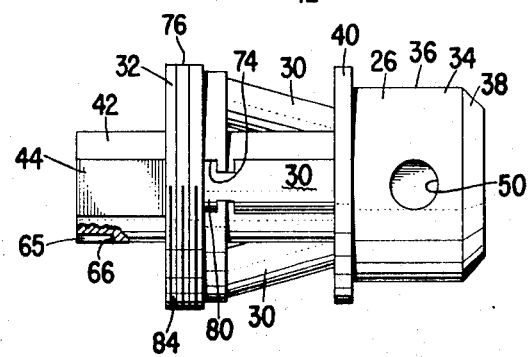
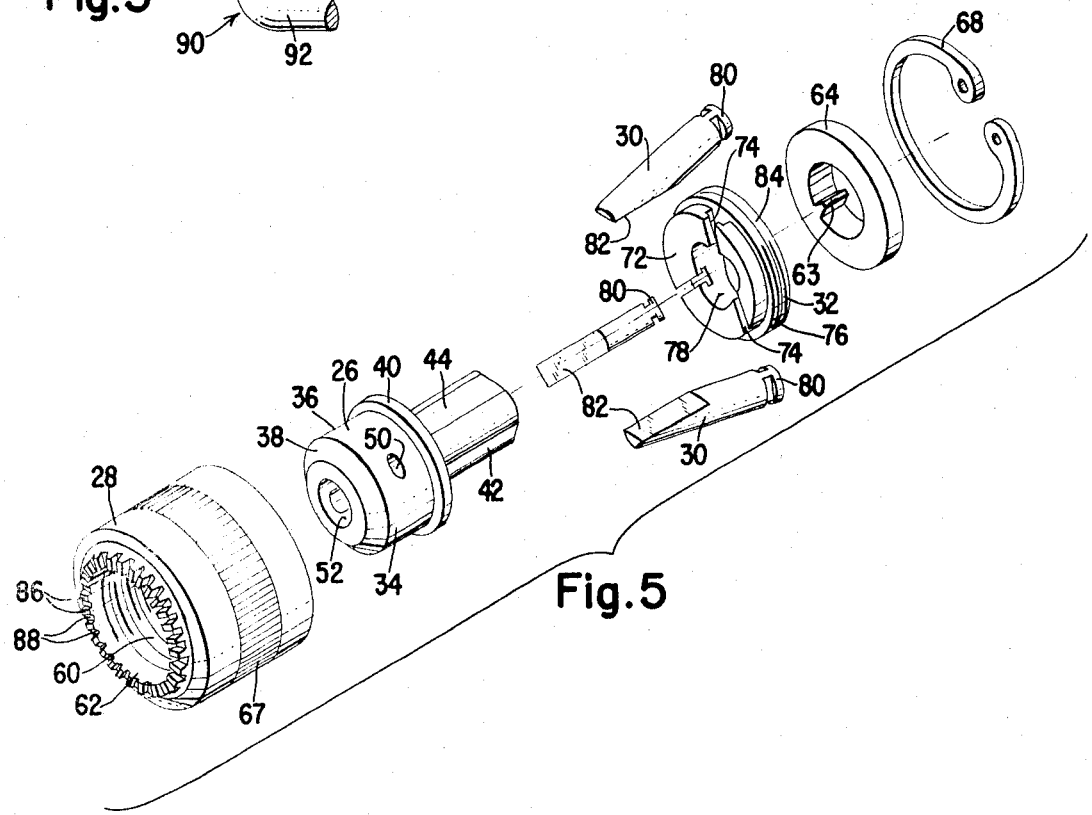

CHUCK

BACKGROUND OF THE INVENTION

Heretofore, chucks of the prior art required special or geared sleeves and keys, the relative rotation of which shifted the jaws to an open or a closed position. In many instances the jaws were threaded, which prevented the use of a common jaw in that the slant of the threads required the jaws to be successively numbered or positioned in a pre-set pattern. Thus, more parts were required and the general construction was more complex. One example of this is the use of a one piece sleeve which might have both internal threading and an integrally formed bevel gear at its outer end.

SUMMARY OF THE INVENTION

In accordance with the present invention the novel chuck is shown, especially adapted for use with power tools, such as drills.

It is therefore an object of the present invention to provide an improved chuck which overcomes the prior art disadvantages; which is simple, economical and reliable; which uses a key of the type that is a threaded screw or bolt, the rotation of which will shift the jaws between an open and a closed position; which uses a two-piece sleeve with the sleeve internally threaded and the connected bevel gear affixed thereto; which uses a sleeve having a pair of pilot holes, one for opening and one for closing the jaws; which uses a key for uni-directional rotation in one or the other of a pair of pilot holes; which pilots the sleeve and rotates the body member in one or the other direction for respectively opening or closing the jaws; and which uses jaws slidably connected to a non-rotating nut which is axially shifted upon the internal threads of the sleeve upon relative rotation of the sleeve and body responsive to rotation of the key.

Other objects and advantages will be apparent from the following description of several embodiments of the invention and the novel features will be particularly pointed out hereinafter in the claims.

BRIEF DESCRIPTION OF THE DRAWINGS

This invention is illustrated in the accompanying drawings in which:

FIG. 1 is a side elevational view of the improved chuck of the present invention embodied in a powder tool, such as a drill;

FIG. 2 is a side elevational view, in section, of a preferred embodiment of the improved chuck showing the jaws in open position;

FIG. 3 is a side elevational view, in section, showing the improved chuck with the jaws in closed position;

FIG. 4 is a side elevational view of the chuck with the sleeve removed;

FIG. 5 is an exploded perspective view of the improved chuck;

FIG. 6 is a side elevational view, in section, of another preferred embodiment of the improved chuck showing the jaws in open position;

FIG. 7 is a side elevational view of the improved chuck of FIG. 6 showing the jaws in closed position;

FIG. 8 is a side elevational view, partly broken away, showing the body having a threaded annular groove to which a pair of key holes of the sleeve are in superposition;

FIG. 9 is a front elevational view, partly broken away and in section, showing a key hole aligned with the threaded groove;

FIG. 10 is an exploded perspective view showing the body and the sleeve of the improved chuck;

FIG. 11 is a diagrammatic representation of a key being rotated to open the jaws of the chuck;

FIG. 12 is a diagrammatic representation of a key being rotated to close the jaws of the chuck; and FIG. 13 is a side elevational view of another embodiment of the present invention showing threaded jaws.

BRIEF DESCRIPTION OF THE INVENTION

A conventional power tool, such as a drill 20, is shown in FIG. 1 embodying the present invention of an improved chuck, designated generally 22, which carries a drill bit 24 therein.

The improved chuck 22 of the preferred embodiment of the present invention is illustrated in greater detail in FIGS. 2 through 5. The chuck 22 comprises a chuck body 26 which carries a relatively rotatable sleeve 28, and three axially shiftable jaws 30 which are slidably affixed to a nut 32.

The body 26 illustrated in FIGS. 2-5, has a head 34 with a substantially cylindrical periphery 36 which has a bevel 38 at the outer end thereof and has a radial flange 40 formed at the inner end of the periphery 36. A shank 32 extends from the flange 40 to the opposite end of the body 26 from the head 34. The shank 42 is formed with at least one axially slabbed section 44. A threaded recess 46 extends inwardly from the outer end of the shank 42 anad has an axis coincidental to the axis 48 of the chuck 22. The recess 46 is adapted to receive the drill spindle (not shown) that connects the chuck 22 to the drill 20. The head 34 has at least one pilot hole 50 extending radially inwardly from the periphery 36 along a line perpendicular to the axis 48.

The forward end of the body 26 shown in FIGS. 2, 3 and 4 has an inwardly extending bore 52 adapted to receive the working implement or drill bit 24 as illustrated in FIG. 1. Three inclined bores 54 extend from a point on the shank 42 behind the flange 40 in a forwardly direction toward the head 34 downwardly and outwardly to intersect the axially bored 52. The jaw 30 is disposed in each of the inclined bores 54 for slidable reciprocable motion therein as set forth more fully hereinafter.

The sleeve 28 illustrated in FIGS. 2, 3 and 5 is substantially cylindrically shaped with a hollow interior which is counterbored from either end as at 56 and 58, with a threaded internal section 60 extending between the counterbores. A bevel gear 62 is affixed within the uper counterbore 58 to extend radially inwardly a short distance. When the sleeve 28, as showno in FIGS. 2 and 3, is placed over the body the bevel gear will contact the radial flange 40 and prevent the sleeve from being removed downwardly from the head 34 of the body 26. The outer periphery of the sleeve 28 has a knurled portion 67 depicted in FIG. 5. An end cap 64 is non-rotatably disposed on the shank 42 and has a projection 63 which fits within an axial slot 65 of the shank 42 and comes to rest against a shoulder 66 formed thereon substantially in line with the lower counterbore 56 against which the end cap will also seat. A split ring 68 is disposed within a groove 70 formed below the counterbore 56 to lock the end cap 64 in position. Prior to connecting the end cap 64 upon the shank 42, the nut 32 will be slid thereon.

The nut 32 is illustrated in FIGS. 2, 3, 4 and 5 and has a forward surface 72 which is segmented by three equidistantly spaced key slots 74 formed therein which extend radially from the periphery 76 to the central opening 78. When viewed from the outer periphery 76 the slots will be T-shaped. The lower end of each of the jaws 30 is formed with a corresponding T-shaped key 80. The forward surface 72 has a radial incline which extends from its central point upwardly and outwardly on an angle of some 15° so that when the keys 80 are disposed within the key slots 74 the gripping surfaces 82 formed at the forward inner ends of the jaws 30 will be substantially parallel to the central axis of the opening 78 which is coincidental to the axis 48 in assembled position. The periphery 76 is stepped to increase in diameter rearwardly from the key slots 74 and has a threaded section 84 formed on the larger diameter section.

The bevel gear 62 includes teeth 86 separated by radial grooves 88, with the teeth and grooves being inclined downwardly toward the axis 48 as illustrated in FIGS. 2 and 3. A chuck key 90 is shown in FIG. 3 and has an L-shaped shank 92 at one end and a pilot 94 formed at the other end to fit within the pilot hole 50 of the body 26, and a bevel pinion gear 96 intermediate the pilot 94 and shank 92. The pinion gear 96 has teeth 98 separated by grooves 100, with the teeth 98 and grooves 100 inclined inwardly toward the pilot 94, corresponding to the incline of the bevel gear 62 whereby on placing the pilot 94 within the pilot hole 50 the gears 62 and 96 will mate.

The jaws 30 shown in FIGS. 2, 3 and 4 are disposed within the inclined bores 54 after being keyed to the nut 32. Engaging the key 90 between the body 26 and the sleeve 28 will cause the pilot 94 to hold the body 26 non-rotative through its engagement in pilot hole 50 while the key 90 is being rotated so as to cause the rotation of the bevel gear 62 and the sleeve 28. The nut 32 is also held non-rotative upon the shank 42 by the jaws 30 engaged in the body 26 but the turning of the sleeve 28 will cause the nut 32 to move forwardly or rearwardly along the axis 48 because of the engagement between the thread sections 60 of the sleeve 28 and the threaded section 84 of the nut 32. The axially shifting of the nut 32 causes the jaws 30 to move likewise between two extremes, namely an open and a closed position illustrated in FIGS. 2 and 3, respectively. The jaws 30 will be axially reciprocated within the incline bores 54 corresponding to the axially motion of the nut 32 with the key 80 radially sliding within the key slot 74 from the outward position shown in FIG. 2 wherein the gripping surface 82 is placed substantially at the same diameter as the axial bore 52 so as to receive the largest size bit therein or clamping by the chuck 22, to the lowered position shown in FIG. 3 wherein the jaws 30 project outwardly from the body 26 and are capable of engaging the smallest size bit with the gripping surfaces 82. The opening of the jaws 30 is produced by rotating the key 90 in one direction, usually counterclockwise, while the closing of the jaws 30 is accomplished responsive to rotating the key 90 in the opposite direction, usually clockwise.

The cylindrical sleeve 28 which has a threaded section 60 is greatly simplified through the use of a connected bevel gear 62 which is separately formed and may be made of a different and harder material because it is subject to more extensive wear.

Another preferred embodiment of the invention is illustrated in FIGS. 6 through 12. In this second preferred embodiment corresponding parts are indicated by the same references numbers as that used for the first embodiment.

The improved chuck, designated generally 102, of the second preferred embodiment comprising a body 26 shown in FIGS. 6, 7 and 10 having a head 104 integrally formed with the shank 42 in which the axially bores 46 and 52 are formed. Three inclined bores 54 extend upwardly from the axial bore 52 equidistantly spaced thereabout toward and through the shank 42 to terminate beyond the flange 40 formed in the head 104. The jaws 30 illustrated in FIGS. 6 and 7 will be diposed in the inclined bores 54, and will be keyed within the nut 32 for radially slidable movement between the key 80 and the key slot 74, while the jaws axially reciprocate within the inclined bores 54 as described in more detail hereinafter. The nut 32 will be disposed about the shank 42 for axial movement relative thereto in a non-rotary fashion. An end cap 64 depicted in FIGS. 6 and 7 will be fitted upon the lower end of the shank 42 to abut upon a shoulder 66 formed thereon. Assembly of the chuck 102 is completed by a sleeve 106 being disposed over the body 26 wherein a radially, inwardly flange 108 formed at the upper end of the sleeve 106 will contact the flange 40. The diameter of the flange 108 is substantially equal to the diameter of the head 104, but relative rotation between the two is possible without binding. The sleeve 106 has a counterbore 110 at its lower end in which is seated the end cap 64 and trapped into position therein by a split ring 68 disposed within a groove 70 formed in the sleeve 106. Hence, the sleeve 106 is locked upon the body 26 by means of the flange 40 and the end cap 64 so that the sleeve 106 is held against relative axially movement, but is free to rotate relative the body 26. Relative rotation of the body 26 or the sleeve 106 will cause the nut 32 to be shifted axially by the engagement between the threads 84 and 60 to cause the jaws 30 to move in unison lengthwise of the inclined bores 54 to engage or disengage a suitable drill bit of the type shown in FIG. 1.

The chuck 102 would be connected to a drill spindle (not shown) received in the threaded bore 46. The drill bit would be inserted into the axial bore 52 wherein it would be engaged by the gripping surfaces 82 of the jaws 30 upon the relative rotation between the body 26 and the sleeve 106 shifting said jaws 30 into contact with the drill bit. The jaws 30 would be shifted between the extremes of an open and closed position, respectively shown in FIGS. 6 and 7, in order to accommodate drill bits of the largest or smallest size, or anything therebetween. Common standard sizes for chucks used in power tools, such as drill 20, would be one-quarter inch, three-eighths inch, and half inch, with the largest size corresponding to the diameter of the axial bore 52. In FIG. 6 the jaws are shown adapted to engage the largest size drill bit and this would correspond to the most open position, with the jaws 30 in communication with and wholly within the axial bore 52. In order to engage the smallest bit which would be in the nature of a one-sixty-fourth of an inch size bit or smaller the jaws 30 would project outwardly from the axial bore 52 as is illustrated in FIG. 7 in a uniformed manner to clamp said bit between the respective gripping surfaces 82.

The head 104 of the body 26 has an annular threaded groove 112 formed on its outer periphery 114 between the flange 40 and the bevel 38 to define a continuous semi-circular thread 116 of substantially concave cross section as shown best in FIGS. 6 and 7.

The sleeve 106 has a stepped outer periphery with the lower portion 118 of larger diameter and knurled. The upper portion 120 of the sleeve 106 is of smaller diameter and has two key holes 122 formed in superposition to the threaded groove 112 on opposite sides of the head 104. If a hypothetical edge line were drawn on the diametrically opposite sides of the head so as to cross the groove 112 in a direction parallel to the axis 48 immediately underneath the key holes 122, such a line would bisect the circular opening 122 leaving the threads exposed on the inner half of the key holes 122 and a semi-circular opening at the outer half of the key holes 122 wholly within the sleeve 106 immediately above the threaded groove 112. The key holes 122, as illustrated in FIG. 9, have a bottom 124 against which the tip 126 of a key or threaded member 128 will come to rest as shown in FIGS. 11 and 12.

The key 128 may be bolt or screw or circular rod with a threaded end or any other suitable threaded member. The key 128 will have a threaded lower portion 130 whose threads 132 are compatible with the annular threaded groove 112 and are of like or similar pitch, thread angle and diameter. The key 128 will be inserted into the key hole 122 and rotated so that the tip 126 bottoms upon the bottom 124 as illustrated in FIGS. 11 and 12. The key 128 will be rotated in the same direction as indicated in FIGS. 11 and 12 by the arrow 134 regardless of whether the chuck 102 is being opened or closed.

The chuck 102 is designed whereby the key hole 122 engaged by the key 128 will remain non-rotative during rotation of the key 128 and the body 26 will be rotated thereby. The threaded portion 132 of the key 128 will be turned down into the keyhole 122 wherein the rotation of the key 128 will rotate the body 26 in one or the other directions dependent upon the pitch of the threads 116, which are inclined in one direction for one keyhole 122 and in the opposite direction at the other keyhole 122. More specifically the pitch of the threads 116 shown in FIG. 11 is directed to rotate the body 26 in a counter-clockwise direction as is indicated by the arrow 136 so as to cause the jaws 30 to close by shifting the jaws 30 upwardly and in a direction outwardly of the head 104, as signified by the arrow 138.

Rotation of either one or the other of the body 26 or the sleeve 106 which in the present instance may be termed "relative rotation" will cause the nut 32 to have its threaded section 84 come into threaded engagement with the threaded inner periphery 60 of the sleeve 106 to result in an axially shifting of the nut 32 between the confines of the end cap 64 and the flange 40. It is to be remembered that the nut 32 is non-rotatively disposed on the shank 42 of the body 26, so that any relative rotation will result in turning of the respective threads to produce axial shifting of the nut 32. The jaws 30 are affixed to the nut 32 and likewise will be axially shifted therewith.

The upper portion 120 of the sleeve 106, as illustrated in FIG. 8, has the top keyhole 122 designated by the word "CLOSE" and the bottom keyhole 122 designated by the word "OPEN," with each word suitably indicated on the section 120 by decal or by being cast, stamped or otherwise suitably imprinted thereon.

Whenever the operator desires to close the jaws 30 of the chuck 102 the key 128 will be placed in the upper keyhole 122 as is shown in FIG. 11 wherein rotation in a direction shown by arrow 134 of the key 128 will cause the body 26 to rotate in a counterclockwise direction indicated by the arrow 136 so as to produce shifting of the jaws 30 (which are assumed to have been opened) to a more closed position as is indicated by the arrow 138.

In order to open the jaws 30 (which are assumed to be in a closed position) the jaws 30 illustrated in FIG. 12 will be shifted in a downward direction as indicated by the arrow 140 by insertion of the key 128 in the lower keyhole 122 and rotation thereof in a direction indicated by the arrow 134 to cause the body 26 to be rotated clockwise as indicated by the arrow 141 so as to open the jaws 30. In either event, if the key 128 has been rotated in the wrong direction of that shown in either FIG. 11 or FIG. 12 it is doubtful if the key 128 could have been inserted into the keyhole 122 sufficiently to cause bottoming and even if it had been bottomed rotation in the wrong direction would cause the key 128 to be unscrewed and thus automatically removed from the keyhole 122.

By choosing any standard thread 116 for the threaded groove 112 the availability of a suitable key 128 is greatly enhanced. If one key 128 were to be lost or misplaced another temporary or permanent key 128 could be utilized by merely using any available screw or bolt having a standard thread siimilar to that of the groove 112. By providing a construction for the chuck 102 in which the key 128 is always turned in the same direction, as indicated by the arrow 134 in FIGS. 11 and 12, operator confusion is eliminated, and all that is required is to insert the key 128 into the clearly marked open or close keyhole 122.

In the embodiment of the invention, shown in FIG. 13, corresponding parts are indicated by the same reference numbers as that used in the previously described and illustrated first and second embodiments. A chuck 142 is shown in FIG. 13 having a body 26 with a head 104 and a shank 144 with a pair of spaced radial flanges 146 and 148 formed thereon. The intermediate flange 148 has bores 150 therein formed in alignment with the inclined bores 54 formed in the head 104 for receipt of jaws 30a having a threaded upper portion 152 formed on the upper side thereof remote from the under-side gripping surface 82. A nut 32a, which is split, is disposed within the recess 154 formed between the flanges 40 and 148 with the threads 156 formed on the inner periphery thereof projecting into the recess 154 for suitable engagement with the threads 152 formed on the jaws 30a.

The sleeve 106a is the same as sleeve 106 of the second preferred embodiment of the present invention except that the threaded section 60 has been eliminated and the counterbore 110 extends upwardly from the lower open end to the regularly inwardly extending flange 108. The diameter of the counterbore 110 is substantially the same as or slightly smaller than the outer diameter of the nut 32a so as to require a force-fit between the sleeve 106a and the nut 32a when the chuck 142 is in assembled position. The axial length of the nut 32a is slightly smaller than the distance between flanges 40 and 148 so that the nut 32a is free to rotate within the recess 154 relative to the body 26. As was the case in the second embodiment, in the FIG. 13 embodiment of the present invention the sleeve 106a and the affixed nut 32a of the chuck 142 will remain non-rotative when the key 128 is disposed in either keyhole 122 so that upon rotation of the key 128 the body 26 will rotate relative thereto. The sleeve 106a holds the body 26 against relative axial movement by the engagement of the split ring 68 with the flange 146, and the flange 108 engaging the flange 40. Additionally, the nut 32a cooperatively prevents axial movement of the flanges 40 and 148. Rotation of the key 128 in the keyhole 122 results in rotation of the body 26 to produce turning of both the body 26 and the jaws 30a whereby the threads 152 and 156 will engage to cause the jaws 30a to move in unison lengthwise of the inclined bores to open or close the jaws 30a, as desired, dependent on whether the upper or lower key hole 122 is used.

It will be understood that the various changes in the details, materials, arrangements of parts and operating conditions which have been herein described and illustrated in order to explain the nature of the invention may be made by those skilled in the art within the principles and scope of the invention.

I claim:
1. A drill chuck comprising:
   a. a body having a head provided with an axial bore extending inwardly from one end thereof, and a plurality of inclined bores converging into the axial bore slanted toward said end,
   b. the body having a shank formed below the head,
   c. a nut disposed about the shank and free to move axially relative thereto,
   d. the nut having a threaded outer circumference and a forward surface,
   e. a plurality of key slots radially formed in the forward surface of the nut,
   f. a plurality of jaws, each having a key formed at the bottom thereof slidably disposed into the key slots of the nut to extend through the inclined bores into the axial bore,
   g. a sleeve having internal threads mounted for rotation on the body but held against axial movement,
   h. the outer circumference of the nut to threadedly engage the internal threads of the sleeve,
   i. holding and rotating means formed on one or the other of the sleeves and the end body,
   j. the holding and rotating means includes a pair of pilot holes formed in the sleeve in superposition to an annular threaded groove formed in the head of the body,
   k. the pair of holes formed in the sleeve are spaced apart so as to be on diametrically opposite sides of the threaded sleeve, whereby the incline of the threads within the threaded groove will be oppositely disposed, slanted in one direction for one of the pilot holes and slanted in the other direction for the other pilot hole, and
   l. a chuck key having a threaded end projecting through one of the pilot holes to hold the sleeve and to engage the threads of the threaded grooves of the head of the body so that turning of the key will cause the head and the nut to rotate to produce an axial shifting of the nut whereby the jaws will be either tightened or loosened by moving into or out of the axial bore of the head
2. The combination claimed in claim 1 wherein:
   a. the threaded member is turnable in one direction within either of the pair of pilot holes to rotate the body in one direction to tighten the jaws and in the opposite direction to loosen the jaws responsive to one or the other of the pilot holes into which the member is inserted.
3. The combination claimed in claim 1 wherein:
   a. each of the pair of pilot holes has a shoulder formed at the bottom thereof,
   b. the member will bottom upon the shoulder in one or the other of the pilot holes so that turning therein will produce rotation of the body.
4. A drill chuck comprising:
   a. a body having a head,
   b. a sleeve mounted for rotation on the body and held against relative axial movement,
   c. jaw means supported in the body,
   d. the head of the body having an annular threaded groove,
   e. a nut carried by the body, free to move axially along the body but held non-rotatively thereon,
   f. the jaws connected to the nut for axial movement therewith,
   g. the nut having a threaded outer circumference,
   h. the sleeve having a threaded inner circumference to be threadedly engaged by the nut, and
   i. a pair of pilot holes formed on opposite sides of the sleeve in superposition to the threaded groove of the body, and to expose the threads thereof on diametrically opposite sides whereby the taper of the threads is oppositely directed, whereby the head is adapted to be turned in one direction or the other direction to cause the nut to be axially shifted to operate the jaw means between an open or a closed position in response to rotary movement relative the body and the sleeve.
5. The combination claimed in claim 4 wherein:
   a. a chuck key having a threaded end is inserted in one or the other of the pilot holes to engage one side or the other of the threaded groove to move the jaws into an open or a closed position responsive to the chuck key rotating the body within the sleeve.
6. The combination claimed in claim 5 wherein:
   a. the chuck key is rotated uni-directionally in one or the other of the pilot holes to rotate the body in one or the other direction to obtain the open or the closed position of the jaws.

* * * * *